(12) United States Patent
Anseth et al.

(10) Patent No.: US 9,195,111 B2
(45) Date of Patent: Nov. 24, 2015

(54) PATTERNED ELECTRO-OPTIC DISPLAYS AND PROCESSES FOR THE PRODUCTION THEREOF

(71) Applicant: E INK CORPORATION, Billerica, MA (US)

(72) Inventors: Jay William Anseth, Canton, MA (US); Richard J. Paolini, Jr., Framingham, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 14/177,279

(22) Filed: Feb. 11, 2014

(65) Prior Publication Data

US 2014/0226198 A1     Aug. 14, 2014

Related U.S. Application Data

(60) Provisional application No. 61/763,209, filed on Feb. 11, 2013.

(51) Int. Cl.
*G02F 1/167* (2006.01)
*G02B 26/02* (2006.01)

(52) U.S. Cl.
CPC ............... *G02F 1/167* (2013.01); *G02B 26/026* (2013.01); *G02F 2001/1678* (2013.01); *G02F 2203/34* (2013.01)

(58) Field of Classification Search
CPC ..... G02F 1/167; G02F 1/153; G02F 2203/34; G02F 2001/1678; G02B 26/026
See application file for complete search history.

(56) References Cited

U.S. PATENT DOCUMENTS

| | | |
|---|---|---|
| 4,418,346 A | 11/1983 | Batchelder |
| 4,602,263 A | 7/1986 | Borror et al. |
| 4,720,449 A | 1/1988 | Borror et al. |
| 4,720,450 A | 1/1988 | Ellis |
| 4,745,046 A | 5/1988 | Borror et al. |
| 4,818,742 A | 4/1989 | Ellis |
| 4,826,976 A | 5/1989 | Borror et al. |
| 4,839,335 A | 6/1989 | Ellis |
| 4,894,358 A | 1/1990 | Filosa et al. |
| 4,960,901 A | 10/1990 | Borror et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 6,017,584 A | 1/2000 | Albert et al. |
| 6,054,071 A | 4/2000 | Mikkelsen, Jr. |

(Continued)

OTHER PUBLICATIONS

Kitamura, T., et al., "Electrical toner movement for electronic paper-like display", Asia Display/IDW '01, p. 1517, Paper HCS1-1 (2001).

(Continued)

*Primary Examiner* — David N Spector
(74) *Attorney, Agent, or Firm* — David J. Cole

(57) ABSTRACT

An electro-optic medium comprises at least one leuco dye such that the electro-optic medium can develop at least two differing colors upon exposure to two or more differing stimuli. The medium allows for development of differing colors in differing areas of the medium, thus allowing formation of intrinsic color within differing areas of a single layer of the same electro-optic medium. In an electrophoretic medium, the colors may be developed within the electrophoretic particles or within the fluid in which the particles are dispersed.

17 Claims, 3 Drawing Sheets

(56) References Cited

U.S. PATENT DOCUMENTS

| | | |
|---|---|---|
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,664,944 B1 | 12/2003 | Albert et al. |
| 6,672,921 B1 | 1/2004 | Liang et al. |
| 6,788,449 B2 | 9/2004 | Liang et al. |
| 6,864,875 B2 | 3/2005 | Drzaic et al. |
| 6,866,760 B2 | 3/2005 | Paolini, Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,075,502 B1 | 7/2006 | Drzaic et al. |
| 7,116,318 B2 | 10/2006 | Amundson et al. |
| 7,167,155 B1 | 1/2007 | Albert et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,535,624 B2 | 5/2009 | Amundson et al. |
| 7,561,324 B2 | 7/2009 | Duthaler et al. |
| 7,667,684 B2 | 2/2010 | Jacobson et al. |
| 7,679,814 B2 | 3/2010 | Paolini et al. |
| 7,791,789 B2 | 9/2010 | Albert et al. |
| 7,839,564 B2 | 11/2010 | Whitesides et al. |
| 7,910,175 B2 | 3/2011 | Webber et al. |
| 7,952,790 B2 | 5/2011 | Honeyman et al. |
| 7,956,841 B2 | 6/2011 | Albert et al. |
| 8,009,348 B2 | 8/2011 | Zehner et al. |
| 8,040,594 B2 | 10/2011 | Paolini, Jr. et al. |
| 8,054,526 B2 | 11/2011 | Bouchard |
| 8,098,418 B2 | 1/2012 | Paolini et al. |
| 8,213,076 B2 | 7/2012 | Albert et al. |
| 8,319,759 B2 | 11/2012 | Jacobson et al. |
| 8,363,299 B2 | 1/2013 | Paolini et al. |
| 8,441,714 B2 | 5/2013 | Paolini, Jr. et al. |
| 8,441,716 B2 | 5/2013 | Paolini, Jr. et al. |
| 8,466,852 B2 | 6/2013 | Drzaic et al. |
| 8,576,470 B2 | 11/2013 | Paolini, Jr. et al. |
| 8,576,476 B2 | 11/2013 | Telfer et al. |
| 8,593,721 B2 | 11/2013 | Albert et al. |
| 8,797,634 B2 | 8/2014 | Paolini, Jr. et al. |
| 2008/0043318 A1 | 2/2008 | Whitesides et al. |
| 2008/0048970 A1 | 2/2008 | Drzaic et al. |
| 2009/0004442 A1 | 1/2009 | Danner |
| 2009/0225398 A1 | 9/2009 | Duthaler et al. |
| 2010/0103502 A1 | 4/2010 | Jacobson et al. |
| 2010/0156780 A1 | 6/2010 | Jacobson et al. |
| 2011/0195629 A1 | 8/2011 | Honeyman et al. |
| 2011/0292487 A1* | 12/2011 | Noh et al. ............ 359/265 |
| 2011/0310461 A1 | 12/2011 | Bouchard et al. |
| 2012/0182597 A1 | 7/2012 | Whitesides et al. |
| 2012/0257269 A1 | 10/2012 | Paolini, Jr. et al. |
| 2012/0293858 A1 | 11/2012 | Telfer et al. |
| 2012/0326957 A1 | 12/2012 | Drzaic et al. |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 773-740.

Yamaguchi, Y., et al., "Toner display using insulative particles charged triboelectrically", Asia Display/IDW '01, p. 1729, Paper AMD4-4 (2001).

Hayes, R.A, et al., "Video-Speed Electronic Paper Based on Electrowetting", Nature, vol. 425, Sep. 25, 2003 pp. 383-385.

* cited by examiner

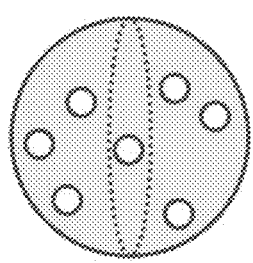
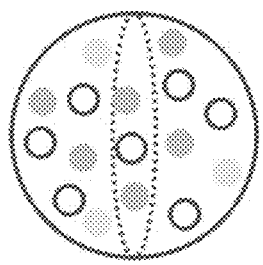
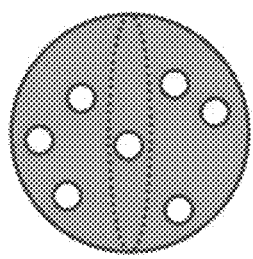
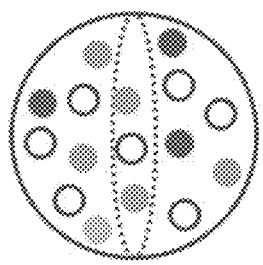
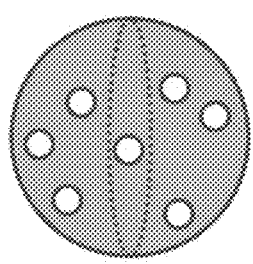
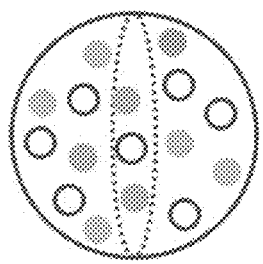
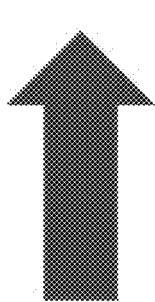
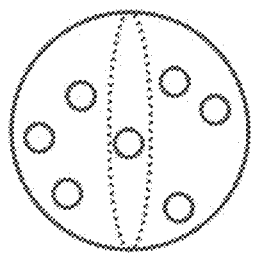
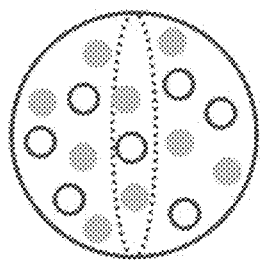
Fig. 1
Fig. 2

PATTERNED ELECTRO-OPTIC DISPLAYS AND PROCESSES FOR THE PRODUCTION THEREOF

REFERENCE TO RELATED APPLICATIONS

This application claims benefit of Application Ser. No. 61/763,209, filed Feb. 11, 2013.

The entire contents of this copending application, and of all U.S. patents and published and copending applications mentioned below, are herein incorporated by reference.

BACKGROUND OF INVENTION

This invention relates to patterned electro-optic displays and processes for the production thereof. More specifically, this invention relates to color electro-optic displays in which electro-optic media capable of displaying differing colors (or other desired optical characteristics) are arranged in a regular pattern.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from black to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870, 657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;
(f) Methods for driving displays; see for example U.S. Pat. Nos. 7,012,600 and 7,453,445;
(g) Applications of displays; see for example U.S. Pat. Nos. 7,312,784 and 8,009,348; and
(h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc. Hereinafter, the term "microcavity electrophoretic display" may be used to cover encapsulated, polymer-dispersed and microcell electrophoretic displays.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Many types of electro-optic media are essentially monochrome, in the sense that any given medium has two extreme optical states and a range of gray levels lying between the two extreme optical states. However, there is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another.

Placing different electro-optic media capable of displaying different colors adjacent one another (usually known as the "intrinsic color" approach, because the colors produced are "intrinsic" to the electro-optic medium itself rather than being the product of passing light through a color filter) is attractive because this approach avoids parallax effects which are inevitably when a color filter is spaced from the electro-optic medium itself along the thickness of a display. However, an intrinsic color electro-optic layer poses peculiar difficulties. As discussed in the aforementioned U.S. Pat. No. 7,667,684, forming an intrinsic color electro-optic layer in practice requires that very small areas of differing electro-optic media be deposited on a substrate in very close proximity to one another. Consider, for example, an intrinsic color electro-optic layer having parallel red, green and blue electro-optic media arranged in parallel stripes. A commercially acceptable color display would require a resolution of about 100 pixels per inch (about 4 pixels per millimeter); this is approximately the resolution of most commercial liquid crystal computer monitors, and the requirements for small displays, such as those used in portable electronic book readers or cellular telephones, are if anything even more stringent. A resolution of 100 pixels per inch requires that the individual stripes of electro-optic media be only 1/300 inch (about 0.08 mm) wide, and that lands between stripes be no wider than about 1/1000 inch (25 µm) to ensure sufficient active area in the colored display. Coating such narrow stripes of electro-optic media on a commercial scale, preferably on a roll-to-roll basis, is difficult if not practicably impossible. Furthermore, commercial coating of at least electrophoretic media is typically effected by slot coating, which is not well adapted for coating such narrows stripes of medium, even when special patterning techniques are employed (see, for example, U.S. Pat. No. 7,910,175). Additional difficulties are introduced by the relatively high viscosities and heterogeneous nature of many electro-optic media.

Even if one succeeds in coating the necessary narrow stripes of electro-optic media separated by even narrower lands, the difficulties in producing high resolution color displays are not ended. More commercial electro-optic media are formed in large sheets, typically in the form of long rolls, which are then severed into pieces of a size needed for individual displays, and the resultant pieces are then laminated, typically under heat and pressure, to a backplane containing the array of pixel electrodes needed to drive the high resolution displays. Obviously, the array of pixel electrodes has to have the same high resolution as the electro-optic medium itself (or, to be more accurate, the effective resolution of the display is the lower of the resolution of the electro-optic medium and array of pixel electrodes), and it is necessary to align the stripes of electro-optic medium with great accuracy with the columns (or rows) of the array of pixel electrodes. In the exemplary display discussed above having stripes of electro-optic media 1/300 inch (0.08 mm) wide, and lands between stripes no wider than 1/1000 inch (25 µm), a deviation in alignment of only about 1/500 inch (50 µm) would have a disastrous effect on the color rendering of the display, and the necessary alignment must be maintained over the whole extent of the display, which might have a diagonal of (say) 6 inches (152 mm). Maintaining this degree of alignment is extremely difficult, especially if both the display itself and the backplane are flexible and based upon polymeric substrates which may distort slightly under the heat and pressure of lamination. Alternative arrangements of differing electro-optic media, such as the use of red/green/blue/white media, and use of checkerboard patterns, only exacerbate the difficulties of coating and alignment already discussed.

Accordingly, there is a need for new methods of preparing high resolution color displays which avoid the aforementioned difficulties in forming intrinsic color electro-optic layers and aligning such layers with backplanes. The present invention seeks to provide such methods, displays formed by such methods, and components useful in producing such displays.

SUMMARY OF INVENTION

Accordingly, in one aspect this invention provides an electro-optic medium comprising at least one leuco dye such that the electro-optic medium can develop at least two differing colors upon exposure to two or more differing stimuli. In a preferred form of the invention, the electro-optic medium can develop at least three differing colors upon exposure to differing stimuli, for example, red, green and blue; yellow, cyan and magenta; or orange, lime and purple (see U.S. Pat. No. 8,054,526). The stimuli used to produce the differing colors might be temperature changes, or exposure to chemical reagents, for example acids or bases, but it is generally preferred that the stimuli have the form of exposure to radiation, desirably radiation of differing wavelengths.

The term "leuco dye" is intended to be interpreted broadly to cover any material having one essentially colorless form and a colored form, the transition between the two forms being effected by any of the forms of stimulus previously mentioned. As already indicated, the phrase "at least two different colors" should similarly be broadly interpreted; whilst in most cases the "colors" will be in the visible region of the spectrum, certain special purpose electro-optic media may have "colors" which differ in luminescence or pseudo-color in the sense of a change in reflectance or transmission of electromagnetic wavelengths outside the visible range. Also, we do not exclude the possibility that the "uncolored" form of the electro-optic medium might actually be colored, with the stimulus serving to destroy or hide the existing color, and/or develop one or more different colors, in the electro-optic medium. Similarly, we do not exclude the possibility that at least one area of the layer of electro-optic medium may remain uncolored during the present process; if, for example, an RGBW electro-optic layer is to be formed, one may begin with a white electro-optic medium and leave the white portions unexposed, preferably effecting the necessary color changes using non-visible radiation which is not reflected by the white electro-optic medium.

This invention also provides a method of forming a colored electro-optic layer, which method comprises forming a layer of an electro-optic medium comprising at least one leuco dye such that the electro-optic medium can develop at least two differing colors upon exposure to two or more differing stimuli; exposing a first area of the layer to a first stimulus, thereby forming a first color in the first area of the layer; and exposing a second area of the layer to a second stimulus, thereby forming a second color, different from the first color in the second area of the layer. This process may be carried out with the layer of electro-optic medium formed on a backplane comprising at least a first electrode disposed adjacent the first area of the layer and a second electrode disposed adjacent the second area of the layer.

The present invention extends to an electro-optic display, electro-optic medium/backplane combination, front plane laminate, inverted front plane laminate or double release film comprising an electro-optic medium of the present invention, and to the corresponding displays and components produced by the method of the present invention.

The displays and display components of the present invention can make use of any of any of the types of electro-optic medium discussed above. The electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined with a plurality of capsules or microcells. Alternatively, the electrically charged particles and the fluid may be present as a plurality of discrete droplets surrounded by a continuous phase comprising a polymeric material. The fluid may be liquid or gaseous. The leuco dye(s) may be present in the fluid or in some or all of the electrically charged particles.

The displays of the present invention can be used in any application in which electro-optic displays have previously been used, for example as part of an electronic book reader, portable computer, tablet computer, cellular telephone, smart card, sign, watch, shelf label, or flash drive.

BRIEF DESCRIPTION OF DRAWINGS

FIG. 1 of the accompanying drawings is a schematic illustration of capsules of a first electrophoretic medium of the present invention in which the leuco dyes are present in the fluid.

FIGS. 2 and 3 are schematic illustrations, similar to that of FIG. 1, of two different electrophoretic media of the present invention in which the leuco dyes are present in the charged particles.

DETAILED DESCRIPTION

Figure 3:
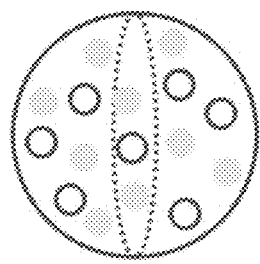
Figure 3:
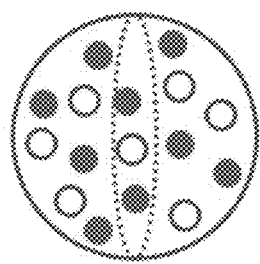
Figure 3:
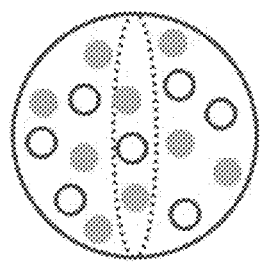
Figure 3:
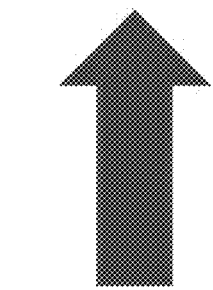
Figure 3:
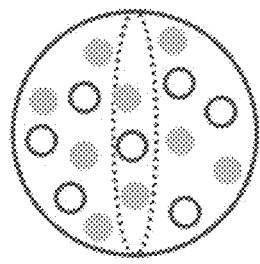

As will be apparent to those skilled in the imaging art from the Summary of the Invention above, the present invention avoids the problems of coating precisely controlled areas of differing electro-optic media on a substrate by coating a single type of electro-optic medium and thereafter developing two or more colors within the electro-optic medium by exposing the medium to appropriate stimuli. In a preferred form of the invention, the electro-optic medium is present on a backplane before the electro-optic medium is colored; this form of the invention also avoids the lamination problems discussed above, and enables the backplane electrodes to be used as fiducial marks to align the colored areas formed in the electro-optic medium with the electrodes themselves. Thus, essentially the present invention decouple electro-optic medium coating and backplane lamination from color patterning through the use of color-changing dyes within the electro-optic medium.

It will be apparent to those skilled in the imaging art that the exact method and location of incorporating the leuco dyes into the electro-optic medium will vary with the nature of the specific electro-optic medium used. For example, if the present invention is applied to a rotating bichromal member medium, the leuco dyes will be incorporated into the rotating bichromal members, while if the present invention is applied to an electrowetting medium, the leuco dyes will be present in the electrowetting fluid (or in one or both electrowetting fluids, if the medium is of type which uses two immiscible fluids).

The present invention is especially but not exclusively intended for use with electrophoretic media, especially microcavity electrophoretic media, and will be illustrated primarily in its application to microencapsulated electrophoretic media. When so applied, all of the microcapsules start out in the same state but are, at a later time, tuned to display different colors. As a result, one does not need to control the spatial pattern of different types of microcapsules during coating nor require stringent alignment tolerances between the electrophoretic medium layer and the backplane during lamination. Rather, after the electrophoretic medium layer is already bonded to the backplane, one can induce a spatial color pattern in the electrophoretic medium layer that is in alignment with the pixel electrodes of the backplane by exposing the electrophoretic medium layer to a patterned stimulus, such as thermal radiation via infrared laser exposure. This process both simplifies and improves the alignment accuracy of the color patterning process, as the application of a color-changing stimulus, such as infrared laser exposure, can be done in a highly controlled fashion and appropriate scanning apparatus is available commercially.

Examples of color-changing dyes include, but are not limited to, the following: acid-base indicators where, for example with rhodamine B, the base form is colorless and the acid form is colored, unimolecular or bimolecular traps where, upon addition of heat, the activated form is colored, and hydrogen-bonded dye crystals where color is created by melting the crystal. Inducing a color transformation via heating may be accomplished by incorporating an infrared-absorbing dye in the internal phase and exposing the microcapsule region of interest to an infrared laser. U.S. Pat. Nos. 4,602,263; 4,720,449; 4,720,450; 4,745,046; 4,818,742; 4,826,976; 4,839,335; 4,894,358 and 4,960,901 disclose other dyes which can develop color on exposure to infra-red radiation of varying wavelengths. Where heat is required to induce a color transformation, an activation energy for the color transformation greater than about 30 kcal/mole is advisable to ensure color stability of the dyes during normal operating conditions.

There are two main approaches to incorporating color-changing materials into electrophoretic media. The first approach, illustrated in FIG. 1 of the accompanying drawings, is to place the color-changing material into the fluid of an electrophoretic medium of a type having only one or more species of electrically charged particles suspended in a colored fluid. Most commonly, such an electrophoretic medium will have a single species comprising white particles.

As illustrated in FIG. 1, such an electrophoretic medium may be formed as a suspension of white, electrically-charged particles in a colorless fluid containing one or more leuco dyes. After coating the electrophoretic medium, typically upon a backplane, stimuli (schematically indicated by the arrow in FIG. 1) are applied to turn the fluid cyan, magenta or yellow (red, green and blue fluids could alternatively be produced) in selected areas of the coating of electrophoretic medium.

The second approach to incorporating color-changing materials into electrophoretic media is to incorporate the color-changing materials into the electrically-charged particles themselves; typically, this approach will be applied to dual particle electrophoretic medium containing two different species of electrically-charged particles in an essentially colorless fluid. As illustrated in FIGS. 2 and 3, there are two main variants of this approach. In the first variant, shown in FIG. 2, multiple different species of color-changing particles are present in the electrophoretic medium, each capable of changing to one specific color, so that upon application of the appropriate stimulus, as indicated by the arrow, the appropriate species of particle will change to cyan, magenta or yellow. In this variant, not all of the color-changing particles within an individual microcapsule would be transformed to their colored state only the particles sensitive to the nature of the applied stimulus or stimuli will transform to their colored state, leaving some uncolored color-changing particles in the final display; in some cases, it may be desired to change the colors of two of the three types of color-changing particles to produce a capsule capable of displaying a particular color. FIG. 2 also illustrates the presence of white particles which are not capable of changing color, but the presence of such "permanently" white particles is not an essential feature of this variant; in some cases, the uncolored form of the color-changing particles may be white in color so that the particles which are not changed in color can act as the white particles in the final medium.

In the second variant of the second approach, as shown in FIG. 3, only a single species of color-changing particles are present in the electrophoretic medium, but this single species is capable of changing to any one of three different colors, for example, cyan, magenta and yellow, depending upon the nature of the stimulus applied. This variant requires color-changing particles having a more complex composition than the first variant, and that can respond to multiple different stimuli to produce different colored particles, but does have the advantage that all of the color-changing particles are transformed to a colored state, so that the electrophoretic medium, in its final form, does not contain any non-functional color-changing particles. Accordingly, it will normally be necessary for the electrophoretic medium to contain non-color-changing white (or other colored) particles.

It will be apparent that a hybrid of the first and second variants discussed above is possible, in which there is one type of color-changing particles which can generate two colors and a second type which can only generate one color.

Figure 4:
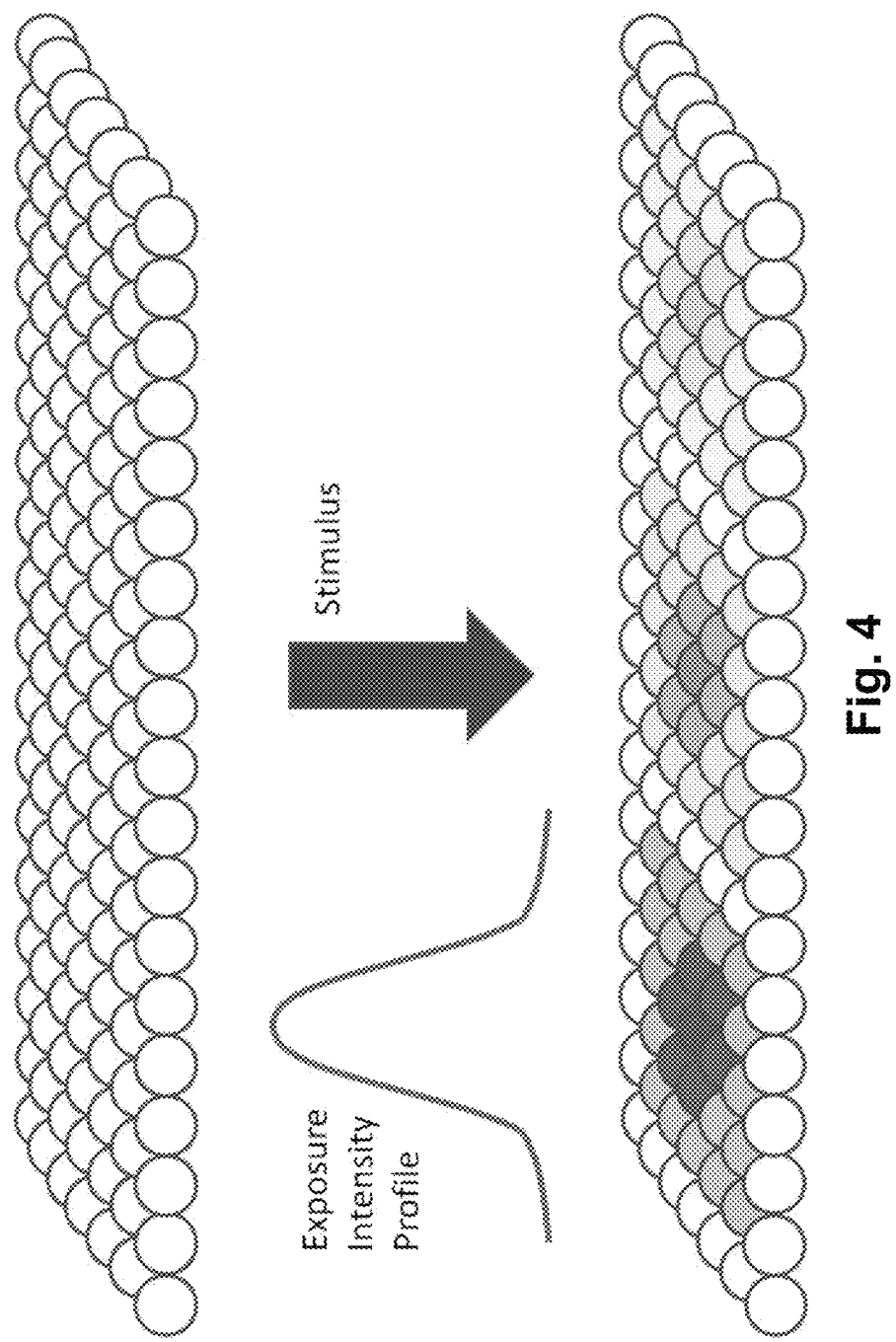
FIG. 4 is a schematic illustration of a preferred method of the present invention.

One potential problem with the electro-optic media of the present invention is color errors due to a single imaging unit (for example a capsule, microcell, droplet in a polymer-dispersed electrophoretic medium, or a bichromal member in a rotating bichromal member medium) straddling two areas intended to display different colors, or being exposed to radiation intended to change the imaging unit to different colors; such unintended exposure might be due to minor errors in aligning the exposed areas of the color-changing medium with the electrodes, or due to internal reflection of the exposing radiation within the electro-optic medium itself. To reduce or eliminate such problems, it is desirable that the individual imaging units be kept sufficiently small that they cannot straddle the lands between pixel electrodes. Furthermore, it is advisable to use a non-uniform exposure profile, as illustrated schematically in FIG. 4. As shown in that Figure, in the preferred exposure profile, the intensity of the exposure within a colored area (corresponding to a pixel electrode) is varied, with the imaging units in the center of the area receiving the highest exposure and the exposure decreasing to essentially zero in the lands. The use of such a profile spatially varies the degree of color saturation of the imaging units so that the color saturation is highest in the center of the area and diminishes radially outward; this type of color saturation patterning minimizes the possibility of color contamination between adjacent areas.

Figure 5:
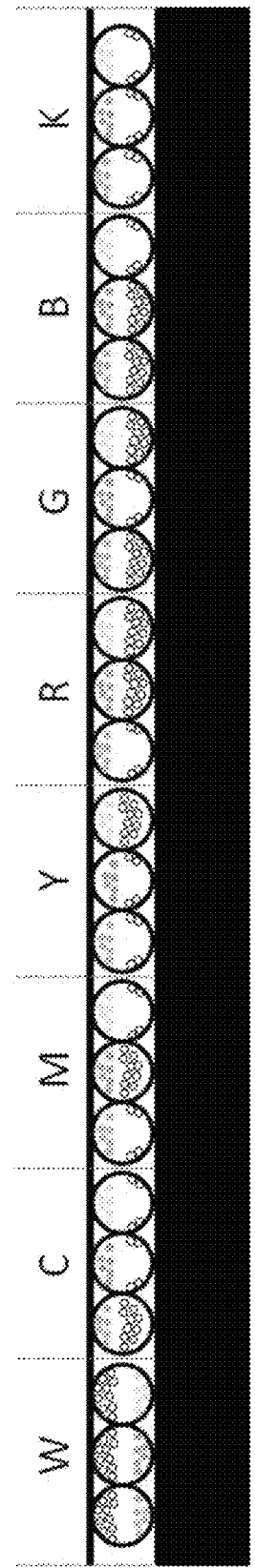
FIG. 5 is a schematic cross-section through an electrophoretic display of the present invention which operates in a shutter mode.

FIG. 5 shows, in a highly schematic manner, how a display of the present invention which comprises separate areas of white/cyan, white/magenta and white/yellow electrophoretic capsules on a dark substrate may be used to provide a high color gamut display. The cyan, magenta and yellow particles are light-transmissive. Each individual capsule has three optical states, namely (a) a first optical state in which the white particles lie adjacent a viewing surface (the upper surface as illustrated in FIG. 5, this being the surface through which a user views the display) so that the pixel displays a white optical state at the viewing surface; (b) a second optical state in which the cyan, magenta or yellow particles are displayed at the viewing surface, and the white particles lie behind the cyan, magenta or yellow particles, thus producing a cyan, magenta or yellow color; and (c) a third optical state in which the cyan, magenta or yellow particles are displayed at the viewing surface but the white particles are moved to the sides of the capsule and occupy only a minor proportion of the area of the capsule, so that light passing through the light-transmissive cyan, magenta or yellow particles is absorbed by the dark substrate and a dark color is displayed at the viewing surface. The necessary "shuttering" of the white particles can be brought about by application of an AC field, the provision of lateral electrodes, or the provision of patterned electrodes occupying a small fraction of the total area of the display in the plane of the electrophoretic layer.

The capsules are shown arranged in the order white/cyan, white/magenta and white/yellow reading left to right in each section of FIG. 5, and the manner in which each color is produced is as follows:
 (a) To produce a white pixel, all capsules are set to their first optical state with the white particles adjacent the viewing surface;
 (b) To produce a cyan pixel, the cyan capsules are set to their second optical state (thus displaying a cyan color), while the magenta and yellow capsules are set to their third optical state (thus displaying a dark color) so that overall the pixel displays a cyan color;
 (c) Magenta and yellow pixels are produced in a manner exactly analogous to cyan, except that the magenta and yellow capsules respectively are in their second optical state, with the other two capsules in their third optical state;
 (d) Red, green and blue pixels are produced in a manner generally analogous to cyan, magenta and yellow, except that two sets of capsules (magenta plus yellow for red, cyan plus yellow for green, and cyan plus magenta for blue) are in their second optical state, with the third set of capsules in its third optical state; and
 (e) Black is produced by setting all capsules to their third optical state.

It will be apparent to those skilled in the imaging art that displays similar to that shown in FIG. 5 can be produced using any desired set of three primary colors, for example, red, green and blue; yellow, cyan and magenta; or orange, lime and purple (see U.S. Pat. No. 8,054,526)

The display of FIG. 5 produces black and white states comparable to those produced by pure monochrome displays while simultaneously increasing the volume of the color gamut of the display as compared to a color display using an RGBW color filter array over a black-and-white, dual-particle electrophoretic medium.

Thus, the present invention provides a color electro-optic display having excellent white and dark states and an improved color gamut as compared with similar displays using a color filter array. The present invention also avoids the difficulties in depositing multiple electro-optic media on a substrate, and aligning the areas of the differing electro-optic media with backplane electrodes discussed in the introductory part of this application.

All patents and patent publications mentioned herein are incorporated herein by reference in their entirety for all purposes. In cases of conflict, the present specification shall control.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:
1. An electro-optic medium comprising at least one leuco dye such that the electro-optic medium can develop at least two differing colors upon exposure to two or more differing stimuli, the electro-optic medium further comprising an electrophoretic material comprising a plurality of electrically charged particles disposed in a fluid and capable of moving through the fluid under the influence of an electric field.

2. An electro-optic medium according to claim 1 wherein the electrically charged particles and the fluid are confined within a plurality of capsules or microcells.

3. An electro-optic medium according to claim 1 wherein the electrically charged particles and the fluid are present as a plurality of discrete droplets surrounded by a continuous phase comprising a polymeric material.

4. An electro-optic medium according to claim 1 wherein at least one leuco dye is present in the fluid.

5. An electro-optic medium according to claim 1 wherein at least one leuco dye is present in at least some of the electrically charged particles.

6. An electro-optic medium according to claim 1 wherein the leuco dye is colored prior to application of any stimulus and at least one stimulus serves to hide or destroy the original color of the leuco dye and/or develop a different color therein.

7. An electro-optic medium according to claim 1 comprising a rotating bichromal member or an electrochromic material.

8. An electro-optic medium according to claim 1 which can develop at least three differing colors upon exposure to differing stimuli.

9. An electro-optic medium according to claim 8 wherein the three differing colors are red, green and blue; or yellow, cyan and magenta.

10. A method of forming a colored electro-optic layer, which method comprises:
    forming a layer of an electro-optic medium comprising at least one leuco dye such that the electro-optic medium can develop at least two differing colors upon exposure to two or more differing stimuli;
    exposing a first area of the layer to a first stimulus, thereby forming a first color in the first area of the layer; and
    exposing a second area of the layer to a second stimulus, thereby forming a second color, different from the first color in the second area of the layer,
    wherein the exposure of at least one of the first and second areas to the first or second stimulus is effected such that a central portion of the area receives a greater application of the stimulus than a peripheral portion of the area.

11. A method according to claim 10 which is carried out with the layer of electro-optic medium formed on a backplane comprising at least a first electrode disposed adjacent the first area of the layer and a second electrode disposed adjacent the second area of the layer.

12. A method according to claim 10 wherein the electro-optic medium which can develop at least three differing colors upon exposure to differing stimuli.

13. A method according to claim 12 wherein the three differing colors are red, green and blue; or yellow, cyan and magenta.

14. A front plane laminate comprising, in order, a light-transmissive electrically-conductive layer; a layer of a solid electro-optic medium comprising at least one leuco dye such that the electro-optic medium can develop at least two differing colors upon exposure to two or more differing stimuli, the electro-optic medium being in electrical contact with the electrically-conductive layer; an adhesive layer; and a release sheet.

15. A double release sheet comprising a layer of a solid electro-optic medium comprising at least one leuco dye such that the electro-optic medium can develop at least two differing colors upon exposure to two or more differing stimuli, and two adhesive layers having the layer of solid electro-optic medium disposed therebetween, at least one of the adhesive layers being covered by a release sheet.

16. A double release sheet comprising a layer of a solid electro-optic medium comprising at least one leuco dye such that the electro-optic medium can develop at least two differing colors upon exposure to two or more differing stimuli , and two release sheets having the layer of solid electro-optic medium disposed therebetween.

17. An inverted front plane laminate comprising, in order, at least one of a light-transmissive protective layer and a light-transmissive electrically-conductive layer; an adhesive layer; a layer of a solid electro-optic medium comprising at least one leuco dye such that the electro-optic medium can develop at least two differing colors upon exposure to two or more differing stimuli; and a release sheet.

* * * * *